3,613,358
DEVICE FOR CONVERTING CALORIFIC ENERGY INTO MECHANICAL ENERGY
Roelf Jan Meijer, Emmasingel, Eindhoven, Netherlands, assignor to U.S. Philips Corporation, New York, N.Y.
Filed Nov. 19, 1968, Ser. No. 777,087
Claims priority, application Netherlands, Dec. 19, 1967, 6717268
Int. Cl. F02g 1/00
U.S. Cl. 60—24
3 Claims

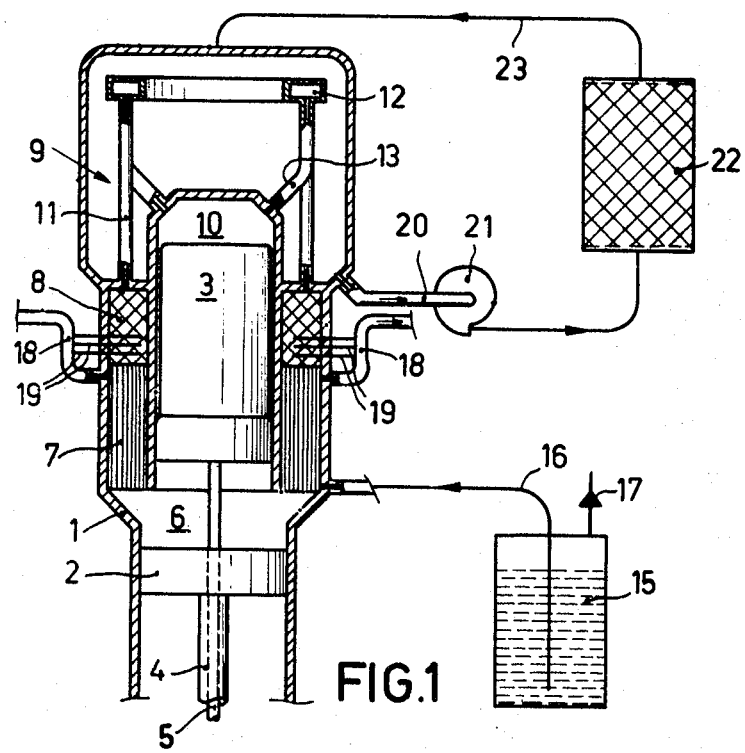
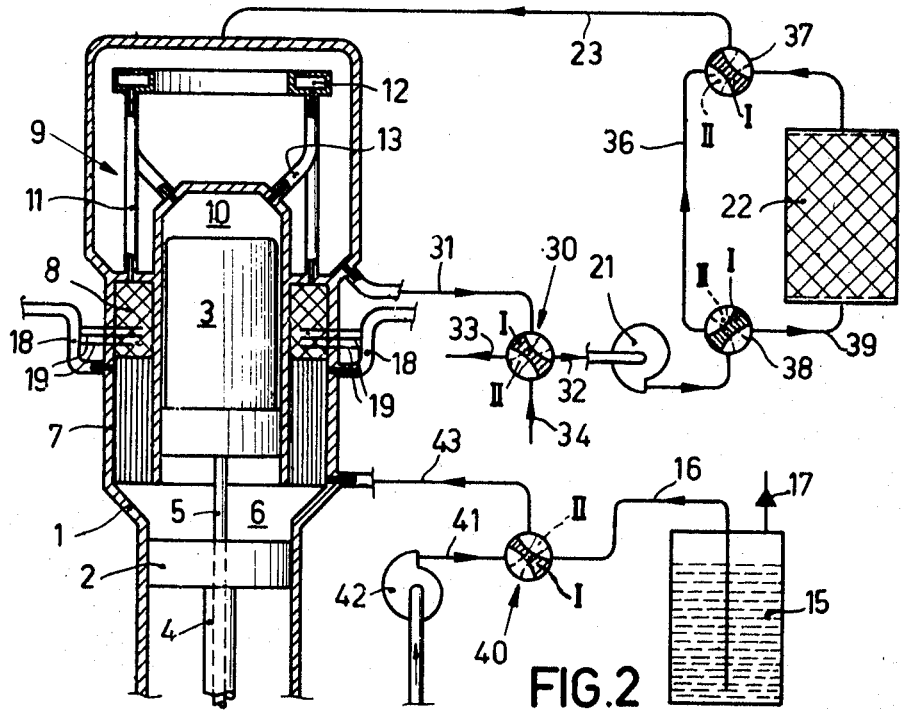
INVENTOR.
ROELF J. MEIJER

ABSTRACT OF THE DISCLOSURE

A hot-gas engine having additional means for selectively supplying thermal energy above ambient temperature to the heater and for withdrawing thermal energy below ambient temperature from the cooler.

---

The invention relates to a device for converting calorific energy into mechanical energy comprising at least one compression space of lower average temperature and variable volume which communicates with at least one expansion space of higher average temperature and also variable volume, a cooler, a regenerator and a heater being arranged in the communication between said spaces through which a working medium can reciprocate on its way from one space to the other, the volumes of the compression space and the expansion space being variable with a mutual phase difference.

A device of the above-described type is the known hot-gas engine. In this engine heat is supplied to the heater at approximately 800° C. by means of a burner, while by means of cooling water conducted through the cooler, thermal energy is withdrawn from the working medium at ambient temperature. If required, air-cooling may be used instead of water-cooling.

Furthermore, the so-called cold-gas engine is known per se. This is a device which, as regards structure, corresponds to the hot-gas engine, but in which the heater takes up thermal energy from the surroundings, as from the ambient air or from cooling water, and in which thermal energy is withdrawn from the cooler by means of liquid gas of low temperature, for example, liquid air, at a temperature which lies below the ambient temperature.

A drawback of these two known devices is in circumstances that the temperature ratio with which they operate is restricted to that of the temperature at which the thermal energy can be supplied to the ambient temperature (hot-gas engine), or to that of the ambient temperature to the temperature of the cold source (cold-gas engine). As a result of this, the specific power of these devices is restricted, in addition to their output.

Another drawback is that in certain circumstances the heat exchange with the surroundings gives rise to difficulties. For example, upon heating a cold-gas engine with moist air, formation of snow and ice occurs in the heater in the proximity of 0° C., so that the heat resistance becomes inadmissibly large.

Both above-mentioned drawbacks can restrict the range of action of a vehicle utilizing one of the above-mentioned engines which operate either on the supply of heat from a heat accumulator or upon the supply of cold from, for example, a container with liquid air. Due to the finite temperature differences which are necessary for reasonable proportions of the cooler or heater, the restricted temperature ratios actually become even more unfavourable and hence the actual outputs and specific powers smaller.

It is the object of the invention to provide a device for converting calorific energy into mechanical energy of the type mentioned in the preamble, which can operate at least temporarily with a large temperature ratio and consequently a high specific power and high output.

In order to achieve the above goal the device according to the invention has a system to supply, at least temporarily, thermal energy to the heater at a temperature which is higher than the ambient temperature, and in which a cooling system is provided which withdraws, at least temporarily, thermal energy from the working medium in the cooler at a temperature which is lower than the ambient temperature.

In this manner a device is obtained which operates at least temporarily with a particularly large temperature ratio and hence a high output. This means in this case, that the energy available in the heat and cold source is converted, with a favourable output into mechanical energy. Furthermore the heater or cooler is no longer in contact with ambient air so that formation of ice on heat-transmitting surfaces cannot occur and the theoretically achievable output and the specific power are no longer adversably influenced by it.

The device according to the invention can be operated in various manners.

For example, it is possible to continuously supply thermal energy to the heater at a temperature which is higher than the ambient temperature, and to withdraw thermal energy from the cooler at a temperature which is lower than the ambient temperature. The supply of thermal energy may take place by means of a burner device or a heat accumulator, while the heat dissipation may take place by cooling the cooler with a liquid gas, for example, liquid air. In that case the device operates constantly with the above-mentioned large temperature ratio and the advantages associated therewith.

Furthermore it is possible to supply thermal energy continuously to the heater at a temperature which is higher than the ambient temperature, and to withdraw, only temporarily, thermal energy from the cooler at a temperature which is lower than the ambient temperature. During the rest of the time the cooler is normally cooled at the ambient temperature. In this device which, during the period that thermal energy is withdrawn from the cooler at ambient temperature, operates as a normal hot-gas engine the power can be considerably increased at those instances at which it is necessary, by cooling the cooler by means of a liquid gas of low temperature.

Furthermore it is possible to supply, only temporarily, thermal energy to the heater at a temperature which is higher than the ambient temperature and to supply thermal energy for the rest of the time at ambient temperature, thermal energy being withdrawn continuously from the cooler at a temperature lying below the ambient temperature. Such a device may be used, for example, in places such as machine shops, mines and so on where the air may not be polluted, in which the device during the time it is arranged in this place, is cooled by means of, for example, liquid air, and the heater withdraws thermal energy from the surrounds. As soon as the device is in the open air thermal energy is supplied to the heater, for example, by means of a burner.

In a favourable embodiment the cooling system comprises a container for gas in a liquid and/or solid phase, preferably air, which communicates through a liquid duct with the cooler and in which an outlet for gas evaporated in the cooler communicates with the cooler. Particularly when the gas is entirely or partly in its solid phase, the available cold is very large. Another advantage is that the temperature of the solid phase is lower than that of the liquid phase, so that temporarily it can be operated with a larger temperature difference and hence with a better output. This means that with a given volume of the container a larger range of action is possible.

In a further favourable embodiment the outlet for evaporated gas is in a heat-exchanging contact with at least part of the regenerator. In this embodiment a part of the cold which is still present in the vapour is used effectively for compensating for regeneration losses.

The device according to the invention can operate with a high output and a high specific power, and is consequently extremely suitable for use in circumstances which depend upon the surroundings with a heat accumulator and a container with liquid air.

In order that the invention may be readily carried into effect, it will now be described in greater detail, by way of example, with reference to the accompanying diagrammatic drawings, in which two devices are shown for converting calorific energy into mechanical energy.

Referring now to FIG. 1, reference numeral 1 denotes a cylinder in which a piston 2 and a displacer 3 are arranged. The piston 2 and the displacer 3 are connected through a piston rod 4 and a displacer rod 5, respectively, to a driving mechanism (not shown) which can move said bodies wtih a phase difference. Between the piston 2 and the displacer 3 there is a compression space 6 which, through a cooler 7, a regenerator 8, and a heater 9, communicates with an expansion space 10. The heater 9 consists of a number of ducts 11 which at one end communicate with the regenerator 8 and at the other end with an annular duct 12, and a number of ducts 13 which at one end communicate with the annular duct 12 and at the other end with the expansion space 10. The device furthermore comprises a cooling system with which at low temperature thermal energy can be withdrawn from the cooler 7. This cooling system comprises a container 15 with liquid air which, through a liquid duct 16, communicates with the inlet side of the cooler 7. The transport of liquid air to the cooler 7 may be effected by maintaining such a vapour pressure in the container 15 by means of the safety valve 17, that consequently liquid is forced through the duct 16. The cooler furthermore comprises an outlet 18 for air evaporated in the cooler. This outlet 18 is in the heat contact 19 with the regenerator 8. Instead of with available liquid air, the container 15 may alternatively be filled with a mixture of liquid air and solid air.

The device furthermore comprises a system for supplying thermal energy to the heater 9. This system comprises an outlet duct 20 communicating with the heater in which a fan 21 is arranged. This duct communicates at one end with a heat accumulator 22 which communicates at its other end through the supply line 23 with the heater. In this system a medium (gas under pressure or liquid) is present which is circulated by a fan 21 and takes up heat from the heat accumulator 22 and delivers it to the heater 9.

In this device the compression of the working medium in the compression space 6 will take place at approximately the temperature of liquid air ±80° K., while thermal energy is supplied to the heater 9 at, for example 900° K. so that the temperature in the expansion space 10 also will show approximately this value. It follows from this large temperature ratio that the output and the specific power of said device will be large. Since both the heater and the cooler operate independently of the surroundings, no difficulties are experienced by the deposition of snow or ice on cooled surfaces, so that the actual outputs are not adversely influenced by it. The high achievable output guarantees a large range of action with a given volume of liquid air and a given heat accumulator. The range of action may be increased with the same container volume by filling the container with a mixture of liquid and solid air, instead of with liquid air. The cold capacity of such a super cooled mixture is larger than of liquid air due to the melting heat present so that more energy is available for conversion into mechanical energy.

The air evaporated in the cooler 7 still has a given cold capacity. This has been used effectively by bringing the outlet 18 in heat exchanging contact with the regenerator so that a large part of the regenerator losses are compensated for which, of course, results in an improvement of the outlet of the device.

Instead of using a heat accumulator, the heater may be supplied with thermal energy by means of a burner or a chemical heating system. With all these possible embodiments, the advantages of a large temperature ratio and hence a high achievable output and specific power are maintained.

The device shown in FIG. 1 operates constantly with a large temperature difference between the compression space and the expansion space. In circumstances it may be desirable to operate only temporarily with this large temperature difference. A device in which this is possible is shown diagrammatically in FIG. 2. The device shown in FIG. 2 corresponds, as regards structure, to that shown in FIG. 1, the various components being therefore referred to by the same reference numerals. In this device, a four-way cock 30 is provided in the heating system between the fan 21 and the heater outlet. Cock 3 communicates with the outlet duct 31 for conducting away medium from the heater, a supply duct 32 which communicates with the suction side of the fan 21, and two ducts 33 and 34 which discharge in the atmosphere. Furthermore a short-circuit duct 36 is provided which communicates, through cocks 37 and 38, with duct 23 and duct 39, respectively. In the position I of cocks 37 and 38 shown in solid lines, so that no medium can flow through the duct 36, and in the position I of the cock 30 shown in solid lines, medium is transported by the fan 21, through the heat accumulator 22 where it is heated, to the heater 9 where the medium delivers its thermal energy. So this is effected at a temperature which is higher than the ambient temperature. By setting the cocks 36 and 38 in their broken-line position II, in which the duct 36 is released and no medium can flow through the accumulator 22 and at the same time the cock 30 is set in its broken-line position II. Ambient air is sucked by the fan 21 through the duct 34 and transported to the heater through the ducts 36 and 23. Said air is again dissipated to the atmosphere through the ducts 31 and 33. The supply of thermal energy to the heater then takes place at ambient temperature.

The cooling system furthermore comprises a three-way-cock 40. This three-way-cock 40 communicates with a duct 16 which communicates at its other end with a container 15 for liquid air, a duct 41 which communicates, through a fan 42, with the atmosphere and a duct 43 which communicates with the cooler 7. In the solid-line-position I of cock 40 liquid air is supplied to the cooler through ducts 16 and 43, so that therein thermal energy is withdrawn from the working medium at a temperature lower than that of the atmosphere.

In the broken-line-position II of cock 40, ambient air is conducted through cooler 7 by the fan 42, through ducts 41 and 43 so that in this case thermal energy is withdrawn from the working medium at ambient temperature.

This device can be operated in different manners by operating the cocks 30, 37, 38 and 40. By setting the cocks 30, 37, 38 and 40 in their position I, the device operates in the same manner and with the same high temperature difference as the device shown in FIG. 1. The device supplies a high power. When this large power is no longer desirable, for example, cock 30 may be set in its position II and the cocks 37 and 38 also in their position II so that the duct 36 is released and no medium flows any longer through the accumulator 22. The temperature at which thermal energy is supplied to the heater is substantially equal to the ambient temperature. When the air is moist and the temperature low so that ice deposits on the heater pipes 11 and 13, the current of air may be conducted through the accumulator 22 for a moment so as to check this by operating the cocks 37 and 38 so that the air is heated considerably and the ice on the ducts 11 and 13 disappears; it is alternatively possible to conduct constantly a small partial current through the accumulator so that the temperature in the duct 23 is kept high so that no formation of ice in the heater can occur. The time during which the accumulator is not connected in the air current may be used, if desired, to charge it again by means of a burner.

Instead of controlling the heater system, power reduction may also be obtained by placing the cock 40 in its position II. By means of the fan 42 ambient air is conducted through the cooler 7 so that in this case thermal energy is withdrawn at ambient temperature.

Instead of a heater system with a heat accumulator, it is alternatively readily possible to use a normal burner. At places where the air may not be polluted, the burner may be switched off and the cooler cooled with liquid air while in other places the burner may be switched on and the cooling system operated with ambient air. For temporary power increase, the cooler may temporarily be cooled additionally with liquid air.

What is claimed is:

1. In a hot-gas engine, having variable-volume compression and expansion spaces operable at relatively lower and higher temperatures respectively, the volumes being variable with a mutual phase difference as a working medium is reciprocally movable therebetween via a regenerator, and a heater and a cooler associated with said compression and expansion spaces respectively, a first means comprising a heat source and closed duct means for supplying thermal energy via a fluid heat exchange medium to the heater to raise the temperature of the working medium to a temperature higher than that of ambient, second means for withdrawing thermal energy from the working medium in the cooler to cool the working medium to a temperature lower than that of ambient, this second means including a quantity of liquid air, valve means for selectively communicating at least one of said first and second means to its respective heater and cooler for at least a temporary time period, and pump means for circulating said heat exchange medium under pressure.

2. Apparatus according to claim 1 further comprising an outlet from the cooler for gas evaporated from said liquid air communicated thereto, said outlet being at least partly in heat-exchanging contact with said regenerator.

3. Apparatus according to claim 1 wherein said first means comprises a heat accumulator including closed duct means for circulating heat-exchange medium between the accumulator and the heater.

References Cited

UNITED STATES PATENTS

| | | | |
|---|---|---|---|
| 2,157,229 | 5/1939 | Bush | 60—24 X |
| 2,583,311 | 1/1952 | Van Heeckeren | 60—24 |
| 3,200,581 | 8/1965 | Weiland | 60—24 |
| 3,397,533 | 8/1968 | Steiner et al. | 60—24 |
| 3,413,801 | 12/1968 | Meijer et al. | 60—24 |
| 3,418,804 | 12/1968 | Meijer et al. | 60—24 |
| 3,457,722 | 7/1969 | Bush | 60—24 |
| 2,564,097 | 8/1951 | Rinia et al. | 60—24 |
| 2,643,508 | 6/1953 | Clay et al. | 60—24 |

MARTIN P. SCHWADRON, Primary Examiner

A. M. OSTRAGER, Assistant Examiner